(12) United States Patent
Park et al.

(10) Patent No.: US 12,489,213 B2
(45) Date of Patent: Dec. 2, 2025

(54) RADAR ANTENNA

(71) Applicant: AMOSENSE CO., LTD., Cheonan-si (KR)

(72) Inventors: Hyunjoo Park, Cheonan-si (KR); Hyungil Baek, Cheonan-si (KR); Seho Lee, Cheonan-si (KR); Yunsik Seo, Cheonan-si (KR)

(73) Assignee: AMOSENSE CO., LTD., Cheonan-si (KR)

( * ) Notice: Subject to any disclaimer, the term of this patent is extended or adjusted under 35 U.S.C. 154(b) by 471 days.

(21) Appl. No.: 18/034,640

(22) PCT Filed: Oct. 28, 2021

(86) PCT No.: PCT/KR2021/015270
§ 371 (c)(1),
(2) Date: Apr. 28, 2023

(87) PCT Pub. No.: WO2022/092832
PCT Pub. Date: May 5, 2022

(65) Prior Publication Data
US 2023/0395980 A1    Dec. 7, 2023

(30) Foreign Application Priority Data
Oct. 30, 2020 (KR) .......... 10-2020-0143704

(51) Int. Cl.
*H01Q 13/06*    (2006.01)
*G01S 7/03*    (2006.01)
*H01P 3/12*    (2006.01)

(52) U.S. Cl.
CPC .............. *H01Q 13/06* (2013.01); *G01S 7/03* (2013.01); *H01P 3/12* (2013.01)

(58) Field of Classification Search
None
See application file for complete search history.

(56) References Cited

U.S. PATENT DOCUMENTS 8,587,483 B2    11/2013  Yoo et al.
11,539,107 B2 *    12/2022  Lim .................. H01P 3/121
(Continued)

FOREIGN PATENT DOCUMENTS

JP    2010-157827 A    7/2010
JP    2011-103578 A    5/2011
(Continued)

OTHER PUBLICATIONS

KR Office Action dated Nov. 21, 2022 as received in Application No. 10-2020-0143704.

*Primary Examiner* — Jany Richardson
(74) *Attorney, Agent, or Firm* — Maschoff Brennan

(57) ABSTRACT

Disclosed is a radar antenna having an antenna and a waveguide that are coupled using a jig on which a plurality of alignment pins are arranged, and thus minimizing tolerance during assembly. The disclosed radar antenna comprises: an alignment jig having a plurality of alignment pins; a circuit board having a plurality of first alignment holes through which the plurality of alignment pins penetrate, and being stacked on the upper surface of the alignment jig; a waveguide having a plurality of second alignment holes through which the plurality of alignment pins penetrate, and being stacked on the upper surface of the circuit board; and an antenna having a plurality of third alignment holes through which the plurality of alignment pins penetrate, and being stacked on the upper surface of the waveguide.

9 Claims, 6 Drawing Sheets

(56) References Cited

U.S. PATENT DOCUMENTS

| | | | |
|---|---|---|---|
| 2010/0164654 A1 | 7/2010 | Fujii | |
| 2012/0217285 A1 | 8/2012 | Rhee | |
| 2018/0226709 A1* | 8/2018 | Mangaiahgari | ......... H01P 5/024 |
| 2019/0207286 A1* | 7/2019 | Moallem | .............. H01Q 1/2283 |
| 2021/0376439 A1* | 12/2021 | Karlsson | ............. H01Q 9/0407 |

FOREIGN PATENT DOCUMENTS

| | | |
|---|---|---|
| KR | 10-1092846 B1 | 12/2011 |
| KR | 10-2012-0015554 A | 2/2012 |
| KR | 10-2015-0124272 A | 11/2015 |
| WO | 2011/059186 A2 | 5/2011 |

\* cited by examiner

RADAR ANTENNA

TECHNICAL FIELD

The present disclosure relates to an antenna, and more particularly, to a radar antenna.

BACKGROUND ART

It is on trend to use a radar antenna for signal transmission and reception for detecting an object around a vehicle. The radar antenna radiates radio waves onto an object, and makes it possible to detect the existence/nonexistence, distance, movement direction, movement speed, identification, and classification of the object by means of reflected waves or scattered waves having bounced off the object.

Recently, for an advancement of anti-collision radar of an autonomous vehicle to cope with a driverless vehicle era, technologies to widen the detection range and to heighten the performance of such a radar antenna have been researched.

The antenna performance of the radar antenna that operates at a high frequency of a millimeter wave band is sensitively changed in case that a tolerance occurs in an assembly process. That is, if an alignment of an antenna (3D radar), a waveguide, and a circuit board (2D PCB) is not accurately made, and thus the tolerance occurs in a manufacturing process, the radar antenna is unable to accurately implement a required antenna performance.

The above matter described as a background technology is to help understanding of the background of the present disclosure, and may include the matter that is not the technology in the related art already known to those of ordinary skill in the art to which the present disclosure pertains.

DISCLOSURE

Technical Problem

The present disclosure has been proposed to solve the above-described problems, and an object of the present disclosure is to provide a radar antenna, which can minimize a tolerance when assembling by coupling an antenna and a waveguide to each other by using a jig on which a plurality of alignment pins are disposed.

Technical Solution

In order to achieve the above object, a radar antenna according to an embodiment of the present disclosure includes: an alignment jig on which a plurality of alignment pins are formed; a circuit board on which a plurality of first alignment holes being respectively penetrated by the plurality of alignment pins are formed, and which is stacked on an upper surface of the alignment jig; a waveguide on which a plurality of second alignment holes being respectively penetrated by the plurality of alignment pins are formed, and which is stacked on an upper surface of the circuit board; and an antenna on which a plurality of third alignment holes being respectively penetrated by the plurality of alignment pins are formed, and which is stacked on an upper surface of the waveguide.

The plurality of alignment pins may have a height that exceeds a value obtained by adding a thickness of the circuit board and a thickness of the waveguide to each other, and may include a plurality of first alignment pins having a first diameter, and a plurality of second alignment pins having a second diameter that is smaller than the first diameter.

The plurality of first alignment pins may be disposed adjacent to an outer periphery of the alignment jig, and the plurality of second alignment pins may be disposed between the plurality of second alignment pins.

The first alignment holes may include a plurality of the (1-1)-th alignment holes having a third diameter and a plurality of the (1-2)-th alignment holes having a fourth diameter that is smaller than the third diameter, the second alignment holes may include a plurality of the (2-1)-th alignment holes having a fifth diameter and a plurality of the (2-2)-th alignment holes having a sixth diameter that is smaller than the fifth diameter, and the third alignment holes may include a plurality of the (3-1)-th alignment holes having a seventh diameter and a plurality of the (3-2)-th alignment holes having an eighth diameter that is smaller than the seventh diameter. In this case, the plurality of first alignment pins may penetrate the plurality of the (1-1)-th alignment holes, the plurality of the (2-1)-th alignment holes, and the plurality of the (3-1)-th alignment holes, and the plurality of second alignment pins may penetrate the plurality of the (1-2)-th alignment holes, the plurality of the (2-2)-th alignment holes, and the plurality of the (3-2)-th alignment holes.

The waveguide may include a lower plate stacked on the upper surface of the circuit board, and an upper plate stacked on the upper surface of the lower plate; and a radio wave transport path may be formed inside the waveguide; and the radio wave transport path may include a through-hole vertically penetrating the lower plate, a through-hole vertically penetrating the upper plate, and a groove in a horizontal direction formed on a lower surface of the upper plate.

The antenna may include: a plurality of slits forming at least one slot group that radiates or receives radio waves; a plurality of the (3-1)-th alignment holes disposed adjacent to a first side and a second side that faces the first side of an outer periphery of the antenna; and a plurality of the (3-2)-th alignment holes having a diameter that is smaller than a diameter of the plurality of the (3-1)-th alignment holes, disposed between the (3-1)-th alignment holes disposed adjacent to the first side and the (3-2)-th alignment holes adjacent to the second side, and disposed adjacent to the slot group that forms the plurality of slits.

Advantageous Effects

According to the present disclosure, the radar antenna has the effect of being able to minimize the tolerance when assembling by making a precise assembly possible since the circuit board, the waveguide, and the antenna are assembled through the alignment jig.

Further, the radar antenna has the effect of being able to minimize the tolerance while minimizing a unit price by forming the radar antenna with a resin material since the circuit board, the waveguide, and the antenna are assembled through the alignment jig.

MODE FOR INVENTION

Figure 1:
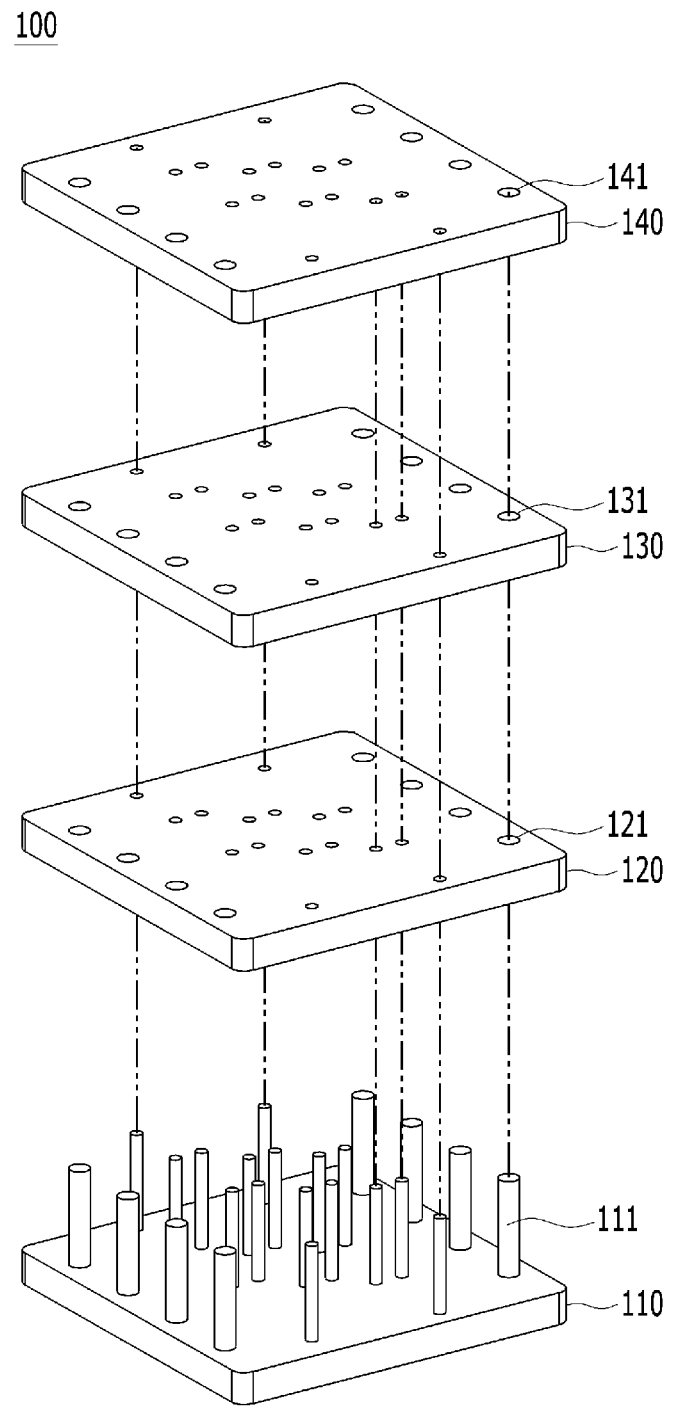
FIGS. 1 and 2 are drawings explaining a radar antenna according to an embodiment of the present disclosure.

For detailed explanation to the extent that those of ordinary skill in the art to which the present disclosure pertains can easily embody the technical idea of the present disclosure, the most preferred embodiment of the present disclosure will be described with reference to the accompanying drawings. First, in giving reference numerals to constituent elements of the respective drawings, it is to be noted that the same constituent elements have possibly the same reference numerals although they are denoted in different drawings. Further, in describing the present disclosure, detailed explanation of related known constitutions or functions will be omitted in case that such detailed explanation may obscure the subject matter of the present disclosure.

Figure 2:
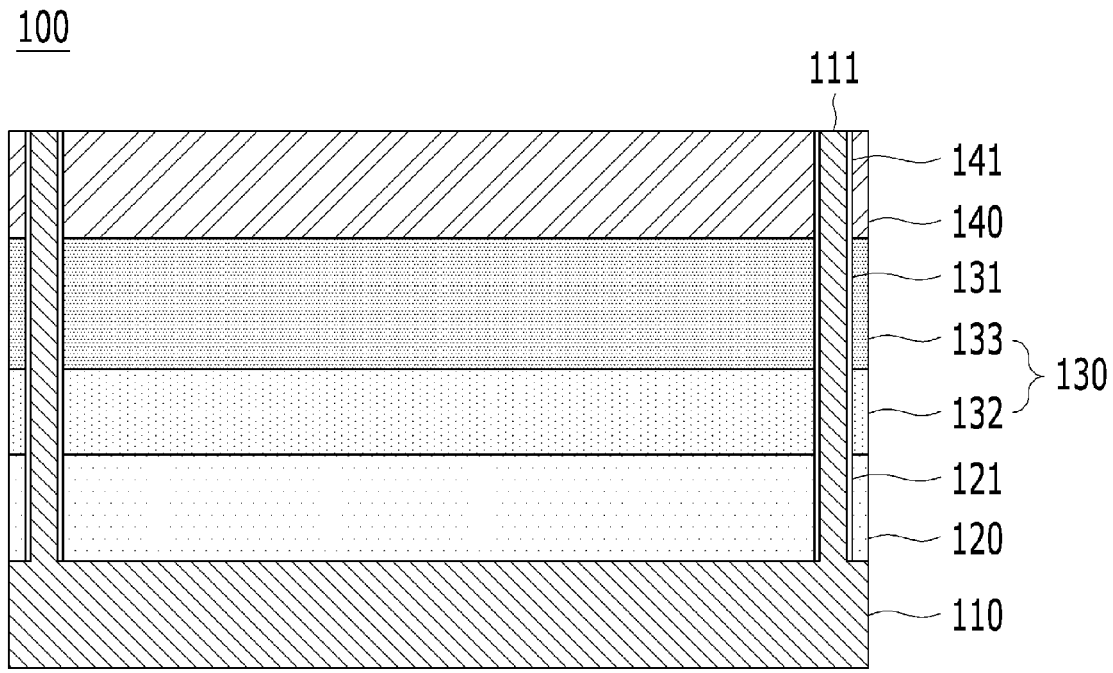

Referring to FIGS. 1 and 2, a radar antenna 100 according to an embodiment of the present disclosure is configured to include an alignment jig 110, a circuit board 120, a waveguide 130, and an antenna 140.

The alignment jig 110 is disposed at a basement of the radar antenna 100. Since the alignment jig 110 is disposed at the basement, and guides in a stacking process of the circuit board 120, the waveguide 130, and the antenna 140, precise assembly of the radar antenna 100 becomes possible to minimize the tolerance.

In particular, in case of producing the radar antenna 100 made of a resin material, the unit price may be lowered, but the tolerance when assembling may be increased. Accordingly, the alignment jig 110 is formed of a metal material, and thus the precise assembling and the tolerance minimization become possible in the process of stacking the circuit board 120, the waveguide 130, and the antenna 140.

On the alignment jig 110, a plurality of alignment pins 111 for aligning the circuit board 120, the waveguide 130, and the antenna 140 are formed. The plurality of alignment pins 111 are formed on the upper surface of the alignment jig 110. The plurality of alignment pins 111 are formed to extend from the upper surface of the alignment jig 110 toward an upward direction (i.e., direction of the antenna 140). In this case, the plurality of alignment pins 111 are integrally formed with the alignment jig 110.

Of course, a plurality of insertion holes (not illustrated) are formed on the alignment jig 110, and the plurality of alignment pins 111 are inserted into the plurality of insertion holes (not illustrated) one to one. In this case, first end parts of the plurality of alignment pins 111 are disposed on the upper part of the alignment jig 110 through penetration of the alignment jig 110 at the lower end of the alignment jig 110.

Figure 3:
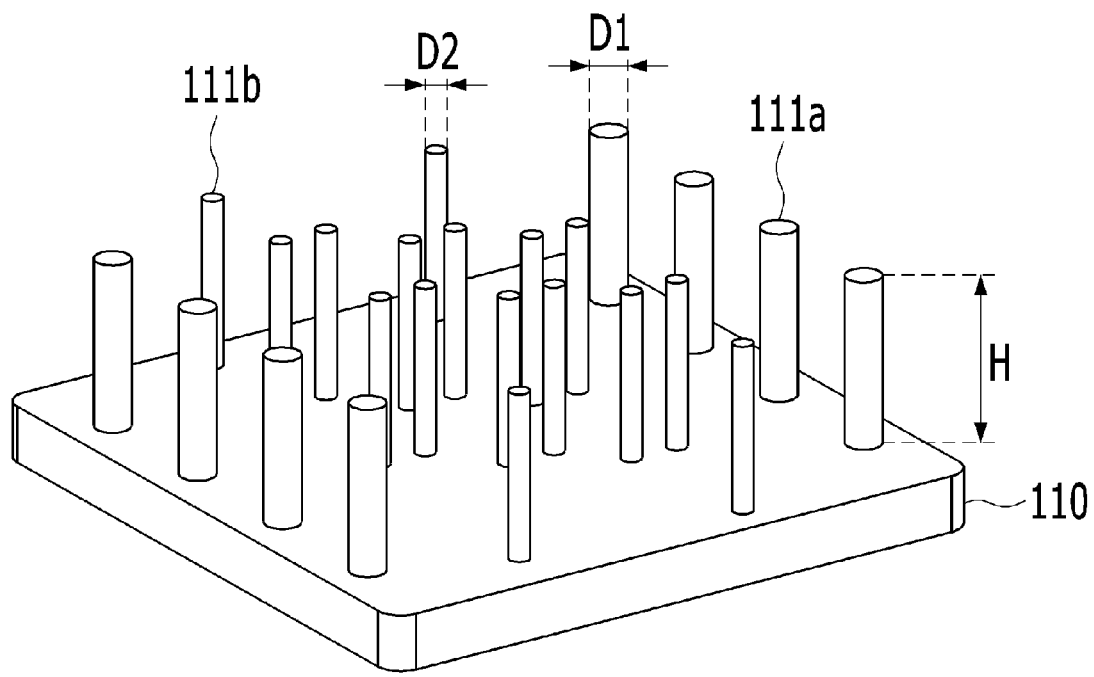
FIG. 3 is a drawing explaining an alignment jig of FIG. 1.

Referring to FIG. 3, the alignment pins 111 are formed to have a height that exceeds a predetermined height. Since the alignment pins 111 guide the circuit board 120, the waveguide 130, and the antenna 140 stacked on the upper part of the alignment jig 110, they should be formed to have a height that exceeds the value obtained by adding at least the thickness of the circuit board 120 and the thickness of the waveguide 130 to each other. Accordingly, the height is set to the value obtained by adding the thickness of the circuit board 120 and the thickness of the waveguide 130 to each other.

Of course, in order to align the circuit board 120, the waveguide 130, and the antenna 140 more stably, the height may be set to the value obtained by adding the thicknesses of the circuit board 120, the waveguide 130, and the antenna 140 stacked on the upper part of the alignment jig 110.

The plurality of alignment pins 111 may configured to include a plurality of first alignment pins 111a having a first diameter D1 and a plurality of second alignment pins 111b having a second diameter D2.

In this case, the first alignment pins 111a having the first relatively large diameter D1 may be disposed adjacent to the outer periphery of the alignment jig 110, and the second alignment pins 111b having the second relatively small diameter D2 may be disposed between the first alignment pins 111a of the alignment jig 110. Here, the first alignment pins 111a are disposed adjacent to the first side and the second side that faces the first side on the outer periphery of the alignment jig 110.

Of course, on the alignment jig 110, the first alignment pins 111a and the second alignment pins 111b may be alternately disposed. Further, for more accurate alignment and fixture, all of the plurality of alignment pins 111 may be formed to have different diameters.

The circuit board 120 is stacked on the upper surface of the alignment jig 110. On the circuit board 120, a plurality of first alignment holes 121 corresponding to the alignment pins 111 of the alignment jig 110 are formed. The plurality of first alignment holes 121 are formed to vertically penetrate the circuit board 120. In this case, the plurality of first alignment holes 121 are formed to have the diameter corresponding to the diameter of the alignment pins 111 that overlap when the circuit board 120 is stacked on the alignment jig 110.

Figure 4:
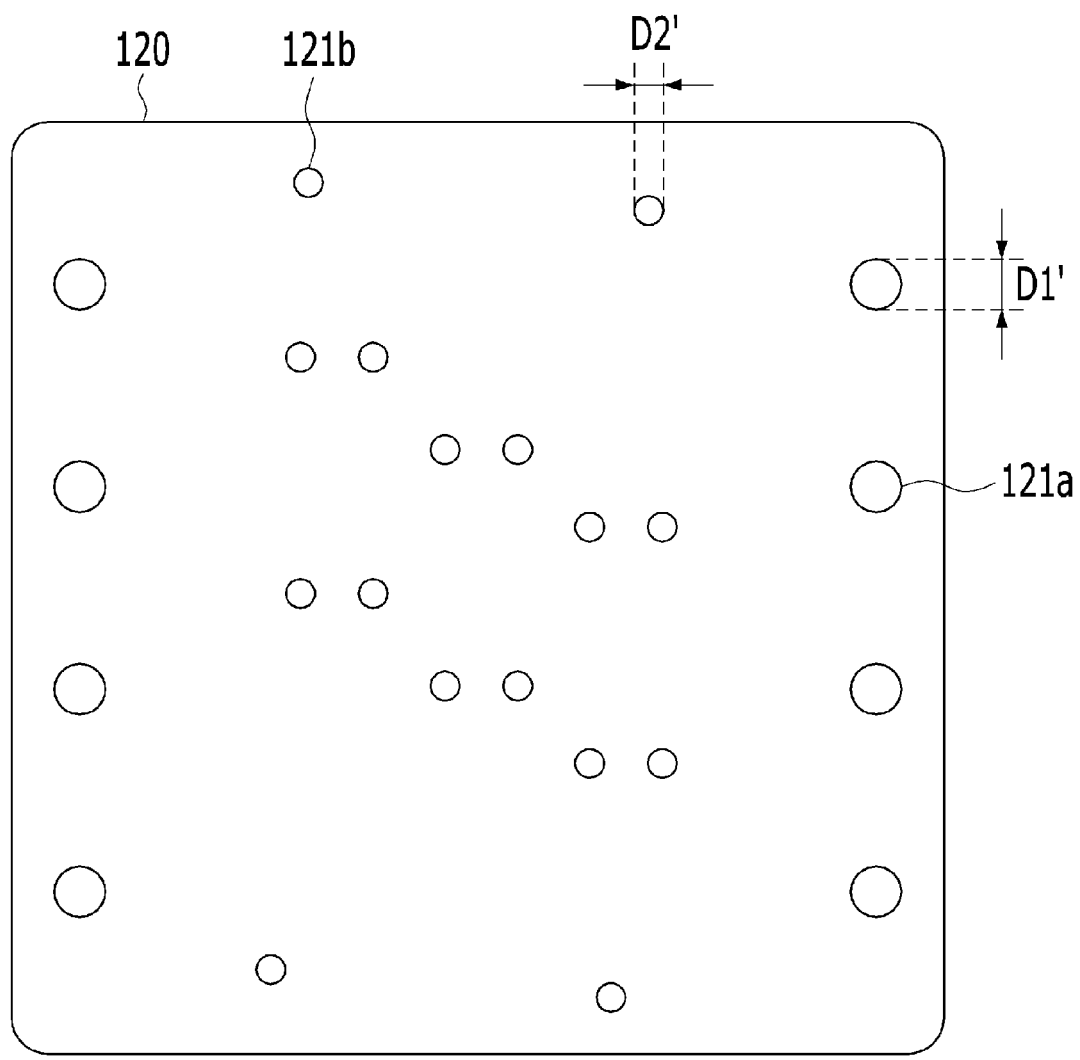
FIG. 4 is a drawing explaining a circuit board of FIG. 1.

As an example, referring to FIG. 4, the plurality of first alignment holes 121 may be configured to include a plurality of the (1-1)-th alignment holes 121a having a third diameter D1' corresponding to the first alignment pins 111a of the alignment jig 110, and a plurality of the (1-2)-th alignment holes 121b having a fourth diameter D2' corresponding to the second alignment pins 111b of the alignment jig 110.

In this case, the (1-1)-th alignment holes 121a having the third relatively large diameter D1' may be disposed adjacent to the outer periphery of the circuit board 120, and the (1-2)-th alignment holes 121b having the fourth relatively small diameter D2' may be disposed between the (1-1)-th alignment holes 121a. Here, the (1-1)-th alignment holes 121a are disposed adjacent to the first side and the second side that faces the first side on the outer periphery of the circuit board 120.

The circuit board 120 is a board that performs processing of an antenna signal, and various elements and circuits for processing the antenna signal are formed thereon.

As an example, a plurality of launchers 122 are formed on the circuit board 120, and the launchers 122 may be classified into transmission launchers and reception launchers. Here, the circuit board 120 may include a plurality of transmission launchers and a plurality of reception launchers.

The transmission launchers are connected to a transmitter of the circuit board 120. The transmission launchers output the radio waves generated from the transmitter (transmission circuit) of the circuit board 120 to a first radio wave transport path of the waveguide 130. That is, the radio waves output from the transmitter are transferred to the transmission launchers, and the transmission launchers output the radio waves to the waveguide 130. The waveguide 130 transfer the radio waves output from the transmission launchers to the antenna 140 through the radio wave transport path 134.

The reception launchers are connected to a receiver of the circuit board 120. The reception launchers transfer the radio waves received through a second radio wave transport path of the waveguide 130 to a receiver (reception circuit) of the circuit board 120. That is, the radio waves received from the antenna 140 are transferred to the waveguide 130, and are transferred to the reception launchers of the circuit board 120 through the radio wave transport path 134 of the waveguide 130. The reception launchers transmit the radio waves received through the radio wave transport path 134 to the receiver.

The waveguide 130 is stacked on the upper surface of the circuit board 120. The waveguide 130 is interposed between the circuit board 120 and the antenna 140. The waveguide 130 may be formed of a resin material, of which the surface is plated, or a metal material.

The waveguide 130 forms the radio wave transport path 134 between the circuit board 120 and the antenna 140. As an example, the waveguide 130 forms the radio wave transport path 134 between the launchers 122 of the circuit board 120 and slits 142 of the antenna 140. In this case, the waveguide 130 may form the radio wave transport path 134 between the reception launchers and the antenna 140, and the radio wave transport path 134 between the transmission launchers and the antenna 140.

Figure 5:
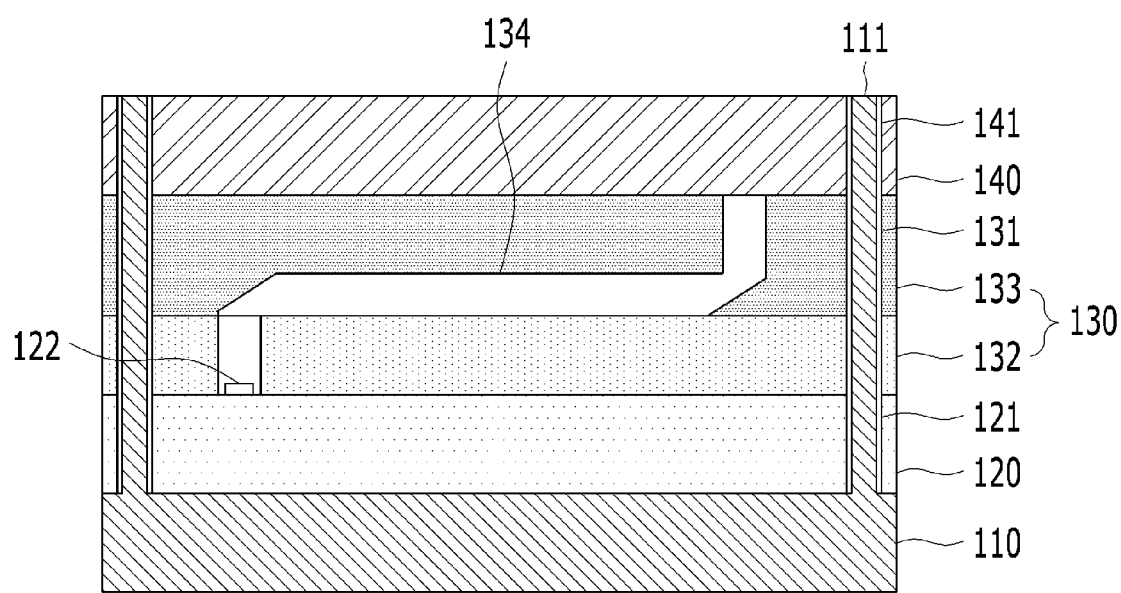
FIGS. 5 and 6 are drawings explaining a waveguide of FIG. 1.

Referring to FIG. 5, the waveguide 130 may be configured to include a lower plate 132 stacked on the upper surface of the circuit board 120, and an upper plate 133 stacked on the upper surface of the lower plate 132. In this case, on the lower plate 132 and the upper plate 133, at least one of a through-hole and a groove is formed, and the radio wave transport path 134 is formed through connection of the through-hole and the groove to each other.

In this case, a first end part of the radio wave transport path 134 is disposed at a location that overlaps the launchers 122 of the circuit board 120, and a second end part of the radio wave transport path 134 is disposed at a location that overlaps the slits (not illustrated) formed on the lower surface of the antenna 140.

In order to identify the degree of alignment of the lower plate 132 and the circuit board 120 when stacking the lower plate 132 on the circuit board, a through-hole that vertically penetrates the lower plate 132 is formed on the lower plate 132, and a groove in a horizontal direction formed on the lower surface of the upper plate 133 and a through-hole that vertically penetrate the upper plate 133 are formed on the upper plate 133. Through this, the radar antenna 100 can minimize the tolerance in the process of stacking the circuit board 120 and the waveguide 130.

In the waveguide 130, a plurality of second alignment holes 131 corresponding to the alignment pins 111 of the alignment jig 110 are formed. The plurality of second alignment holes 131 are formed to vertically penetrate the waveguide 130. In this case, the plurality of second alignment holes 131 are formed to have the diameter corresponding to the diameter of the alignment pins 111 that overlap when being stacked on the upper surface of the circuit board 120 that is stacked on the alignment jig 110.

Figure 6:
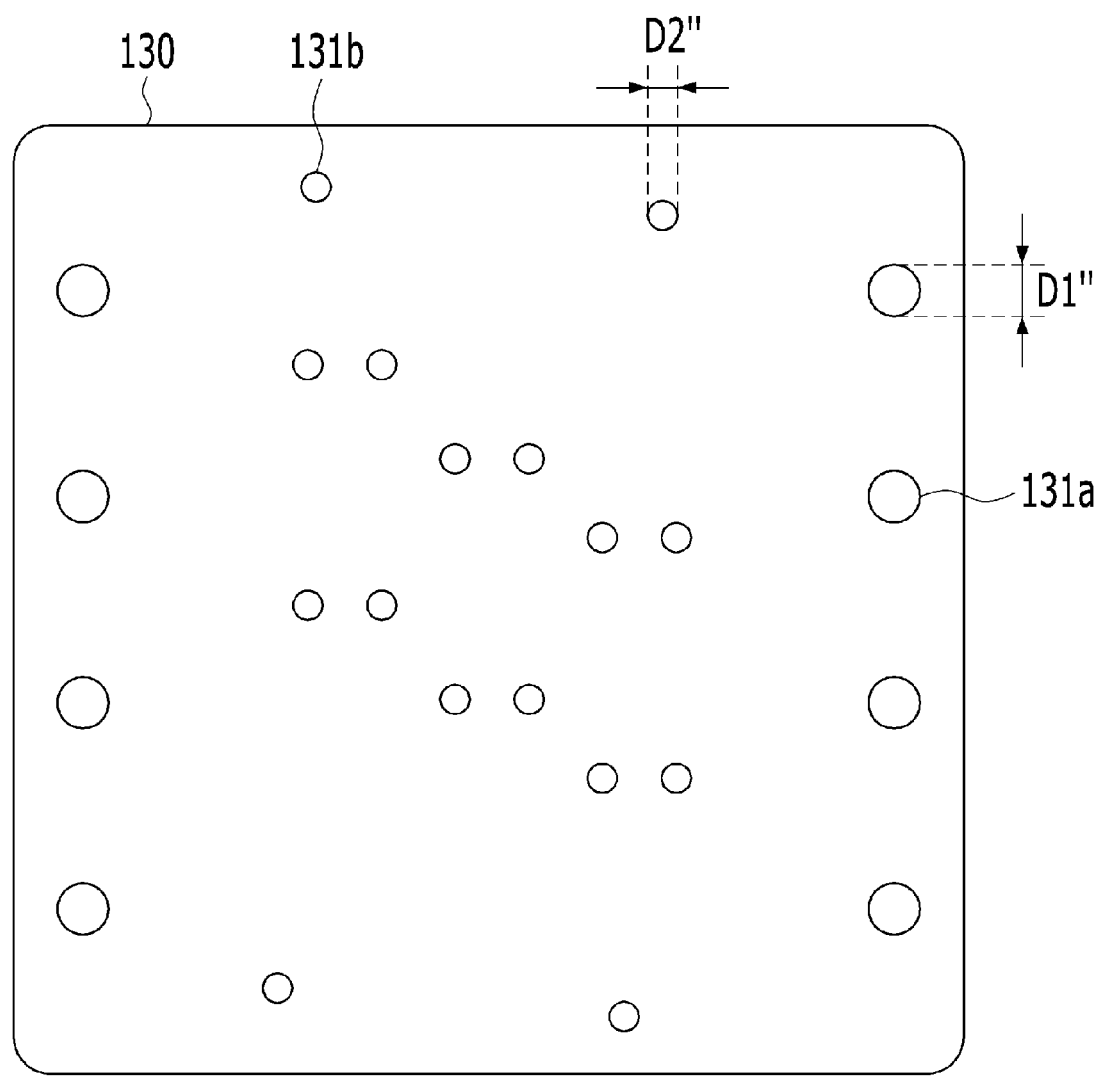

As an example, referring to FIG. 6, the plurality of second alignment holes 131 may be configured to include a plurality of the (2-1)-th alignment holes 131*a* having a fifth diameter D1″ corresponding to the first alignment pins 111*a* of the alignment jig 110, and a plurality of the (2-2)-th alignment holes 131*b* having a sixth diameter D2″ corresponding to the second alignment pins 111*b* of the alignment jig 110.

In this case, the (2-1)-th alignment holes 131*a* having the fifth relatively large diameter D1″ may be disposed adjacent to the outer periphery of the waveguide 130, and the (2-2)-th alignment holes 131*b* having the sixth relatively small diameter D2″ may be disposed between the (2-1)-th alignment holes 131*a*. Here, the (2-1)-th alignment holes 131*a* are disposed adjacent to the first side and the second side that faces the first side on the outer periphery of the waveguide 130.

The antenna 140 is stacked on the upper surface of the waveguide 130. In this case, a coverlay for protecting the antenna 140 may be stacked on the upper surface of the antenna 140.

Figure 7:
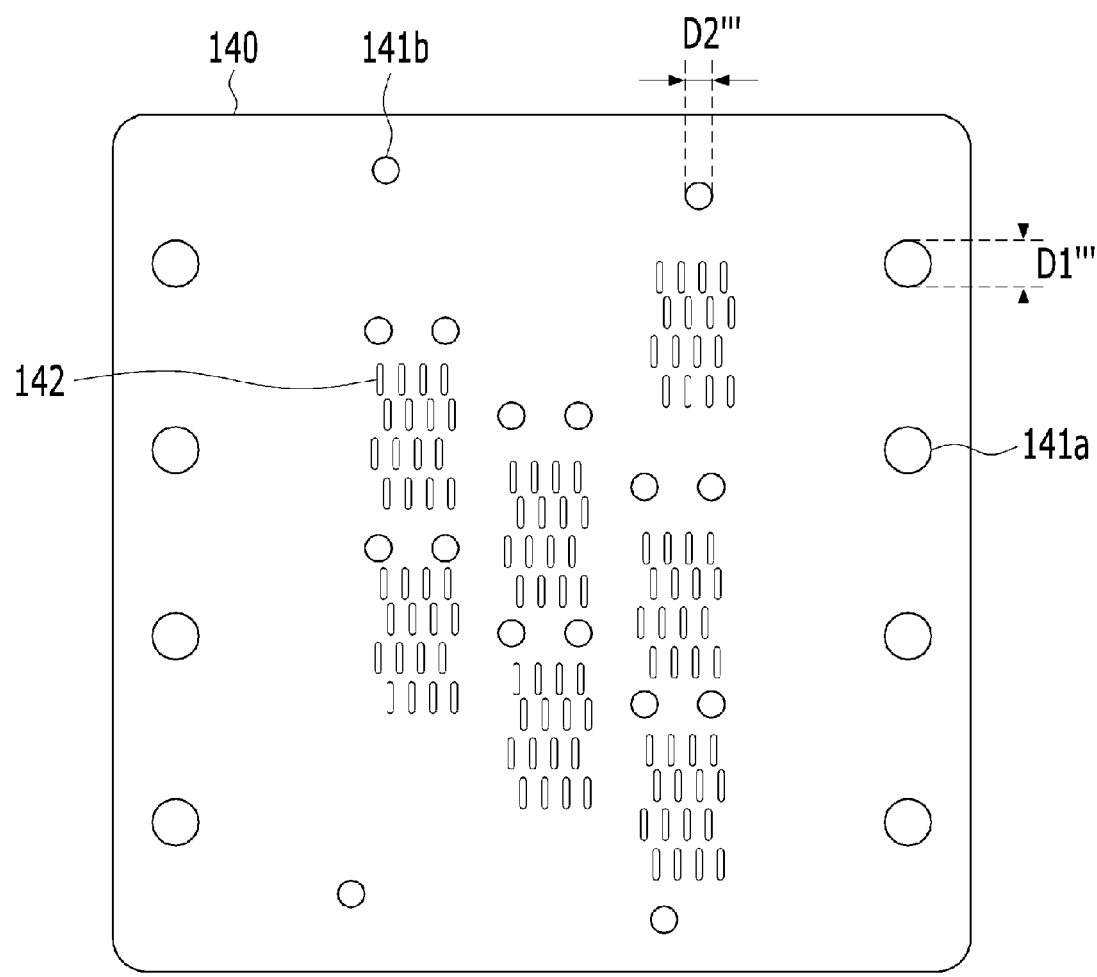
FIG. 7 is a drawing explaining an antenna of FIG. 1.

Referring to FIG. 7, a plurality of slits 142 for radiation and reception of the radio waves are formed on the upper surface of the antenna 140. The plurality of slits 142 include a plurality of radiation slits for radiation of the radio waves and a plurality of reception slits for reception of the radio waves. A plurality of port slits being connected to the radio wave transport path 134 of the waveguide 130 are formed on the lower surface of the antenna 140. In this case, the plurality of radio wave transport paths 134 are formed inside the antenna 140, and the radio wave transport paths 134 connect the radiation slits or the reception slits to the port slits.

A plurality of third alignment holes 141 corresponding to the alignment pins 111 of the alignment jig 110 are formed on the antenna 140. The plurality of third alignment holes 141 are formed to vertically penetrate the antenna 140. In this case, the plurality of third alignment holes 141 are formed to have the diameter corresponding to the diameter of the alignment pins 111 of the alignment jig 110 that overlaps when being stacked on the upper surface of the waveguide 130 stacked on the circuit board 120.

As an example, the plurality of third alignment holes 141 may be configured to include a plurality of the (3-1)-th alignment holes 141*a* having a seventh diameter D1‴ corresponding to the first alignment pins 111*a*, and a plurality of the (3-2)-th alignment holes 141*b* having an eighth diameter D2‴ corresponding to the second alignment pins 111*b* of the alignment jig 110.

In this case, the plurality of the (3-1)-th alignment holes 141*a* are disposed adjacent to the outer periphery of the antenna 140, and the plurality of the (3-2)-th alignment holes 141*b* are disposed adjacent to a slot group formed by a plurality of slits 142. Here, the plurality of the (3-1)-th alignment holes 141*a* are disposed adjacent to the first side and the second side that faces the first side on the outer periphery of the antenna 140.

As the circuit board 120, the waveguide 130, and the antenna 140 are sequentially stacked on the upper part of the alignment jig 110, the first alignment pins 111*a* of the alignment jig 110 sequentially penetrate the (1-1)-th alignment holes 121*a* of the circuit board 120, the (2-1)-th alignment holes 131*a* of the waveguide 130, and the (3-1)-th alignment holes 141*a* of the antenna 140; and the second alignment pins 111*b* of the alignment jig 110 sequentially penetrate the (1-2)-th alignment holes 121*b* of the circuit board 120, the (2-2)-th alignment holes 131*b* of the waveguide 130, and the (3-2)-th alignment holes 141*b* of the antenna 140.

Through this, the alignment jig 110 makes the precise assembling of the circuit board 120, the waveguide 130, and the antenna 140 possible, and can minimize the tolerance when assembling.

As described above, although a preferred embodiment according to the present disclosure has been described, it is understood that various modifications are possible, and those of ordinary skill in the corresponding technical field can make various modifications and correction examples without deviating from the claims of the present disclosure.

The invention claimed is:

1. A radar antenna comprising:
an alignment jig on which a plurality of alignment pins are formed;
a circuit board on which a plurality of first alignment holes being respectively penetrated by the plurality of alignment pins are formed, and which is stacked on an upper surface of the alignment jig;
a waveguide on which a plurality of second alignment holes being respectively penetrated by the plurality of alignment pins are formed, and which is stacked on an upper surface of the circuit board; and
an antenna on which a plurality of third alignment holes being respectively penetrated by the plurality of alignment pins are formed, and which is stacked on an upper surface of the waveguide.

2. The radar antenna of claim 1, wherein the plurality of alignment pins have a height that exceeds a value obtained by adding a thickness of the circuit board and a thickness of the waveguide to each other.

3. The radar antenna of claim 1, wherein the plurality of alignment pins comprise:
a plurality of first alignment pins having a first diameter; and
a plurality of second alignment pins having a second diameter that is smaller than the first diameter.

4. The radar antenna of claim 3, wherein the plurality of first alignment pins are disposed adjacent to an outer periphery of the alignment jig, and
the plurality of second alignment pins are disposed between the plurality of first alignment pins.

5. The radar antenna of claim 3, wherein the first alignment holes include a plurality of the (1-1)-th alignment holes having a third diameter and a plurality of the (1-2)-th alignment holes having a fourth diameter that is smaller than the third diameter,
the second alignment holes include a plurality of the (2-1)-th alignment holes having a fifth diameter and a plurality of the (2-2)-th alignment holes having a sixth diameter that is smaller than the fifth diameter, and
the third alignment holes include a plurality of the (3-1)-th alignment holes having a seventh diameter and a plurality of the (3-2)-th alignment holes having an eighth diameter that is smaller than the seventh diameter.

6. The radar antenna of claim 5, wherein the plurality of first alignment pins penetrate the plurality of the (1-1)-th alignment holes, the plurality of the (2-1)-th alignment holes, and the plurality of the (3-1)-th alignment holes, and
the plurality of second alignment pins may penetrate the plurality of the (1-2)-th alignment holes, the plurality of the (2-2)-th alignment holes, and the plurality of the (3-2)-th alignment holes.

7. The radar antenna of claim 1, wherein the waveguide comprises:
a lower plate stacked on the upper surface of the circuit board; and
an upper plate stacked on the upper surface of the lower plate.

8. The radar antenna of claim 7, wherein a radio wave transport path is formed inside the waveguide, and
the radio wave transport path comprises:
a through-hole vertically penetrating the lower plate;
a through-hole vertically penetrating the upper plate; and
a groove in a horizontal direction formed on a lower surface of the upper plate.

9. The radar antenna of claim 1, wherein the antenna comprises:
a plurality of slits forming at least one slot group that radiates or receives radio waves;
a plurality of the (3-1)-th alignment holes disposed adjacent to a first side and a second side opposite to the first side among an outer periphery of the antenna; and
a plurality of the (3-2)-th alignment holes having a diameter that is smaller than a diameter of the plurality of the (3-1)-th alignment holes, disposed between the (3-1)-th alignment holes disposed adjacent to the first side and the (3-2)-th alignment holes adjacent to the second side, and disposed adjacent to the slot group that forms the plurality of slits.

* * * * *